United States Patent
Towner

(10) Patent No.: US 7,460,146 B2
(45) Date of Patent: Dec. 2, 2008

(54) DYNAMIC CORRECTION OF FIELD CURVATURE FROM A SCANNER

(76) Inventor: David K. Towner, 11311 Chinden Blvd., Boise, ID (US) 83714-0021

( * ) Notice: Subject to any disclaimer, the term of this patent is extended or adjusted under 35 U.S.C. 154(b) by 360 days.

(21) Appl. No.: 10/978,078

(22) Filed: Oct. 28, 2004

(65) Prior Publication Data

US 2006/0023060 A1  Feb. 2, 2006

Related U.S. Application Data

(60) Provisional application No. 60/591,781, filed on Jul. 28, 2004.

(51) Int. Cl.
 *B41J 27/00* (2006.01)
 *B41J 2/47* (2006.01)
 *B41J 2/435* (2006.01)
(52) U.S. Cl. .................. 347/259; 347/234; 347/248
(58) Field of Classification Search .................. 347/259, 347/234, 248
 See application file for complete search history.

(56) References Cited

U.S. PATENT DOCUMENTS

| | | | |
|---|---|---|---|
| 4,906,061 A | | 3/1990 | Yamaguchi |
| 5,103,091 A | * | 4/1992 | Hirose et al. ............... 250/235 |
| 5,615,038 A | | 3/1997 | Suzuki et al. |
| 5,789,743 A | * | 8/1998 | Van Rosmalen ............ 250/234 |
| 6,049,409 A | * | 4/2000 | Nakaie ....................... 359/216 |
| 6,141,031 A | * | 10/2000 | Nowak et al. ............... 347/236 |
| 6,536,862 B2 | * | 3/2003 | Ninomiya ..................... 347/15 |
| 6,917,376 B2 | * | 7/2005 | Miyagawa ................... 347/258 |
| 7,038,706 B1 | * | 5/2006 | Hiyoshi ....................... 347/238 |
| 2001/0012043 A1 | * | 8/2001 | Yamawaki et al. .......... 347/129 |
| 2002/0027595 A1 | * | 3/2002 | Okino et al. ................. 347/255 |
| 2005/0162453 A1 | * | 7/2005 | Able et al. .................... 347/16 |

FOREIGN PATENT DOCUMENTS

| | | |
|---|---|---|
| JP | 58-057108 | 4/1983 |
| JP | 03-028818 | 2/1991 |
| JP | 03-073909 | 3/1991 |
| JP | 07-218855 | 8/1995 |
| JP | 08-286135 | 11/1996 |

OTHER PUBLICATIONS

British Search Report dated Sep. 27, 2005.

* cited by examiner

*Primary Examiner*—An H. Do
*Assistant Examiner*—Sarah Al Hashimi

(57) ABSTRACT

Systems and methods are described that dynamically correct field curvature and other focus errors in imaging systems that use rotating scanners to scan an image field. The dynamic correction controls the focusing of an image field such that focus is maintained across the width of a photosensitive element as a rotating scanner scans the field. The described systems and methods enable the use of post-objective scanning configurations in which the complexity and expense of objective lenses is significantly reduced.

14 Claims, 14 Drawing Sheets

DYNAMIC CORRECTION OF FIELD CURVATURE FROM A SCANNER

CROSS REFERENCE TO RELATED APPLICATION(S)

This application claims priority of U.S. Provisional Application 60/591,781, DYNAMIC CORRECTION OF FIELD CURVATURE FROM A SCANNER, filed Jul. 28, 2004.

TECHNICAL FIELD

The present disclosure generally relates to imaging devices, and more particularly, to dynamically correcting image field curvature introduced by a rotating scanner, such as a rotating polygon scanner.

BACKGROUND

EP (electrophotographic) process imaging devices, such as laser printers, typically use rotating polygon scanners to scan one or more focused laser spots across the width of a photosensitive element, such as a photosensitive drum or belt. FIG. 1 illustrates a conventional EP process device implemented as a laser printer 100. The plane swept out by a scanned laser beam 102(a) intersects a photosensitive element 104 in a scan line 106, and the passage of a focused laser spot along the scan line 106 exposes a row of pixels in the image being printed. Conventional imaging systems, such as that shown in laser printer 100, use pre-objective scanning, wherein a rotating polygon scanner 112 is located "before" an objective lens 108. More specifically, the "objective" 108 or scan lens 108 is located "downstream" from a rotating polygon scanner 112, between the polygon scanner 112 and the photosensitive element 104. The objective lens 108 in a pre-objective scanning system flattens the image field and forms well-focused image spots on the photosensitive element 104 over the full length of the scan line 106.

FIG. 2 illustrates a laser printer 200 in a post-objective scanning configuration, wherein the rotating polygon scanner 112 is located "after" the objective lens 202. More specifically, objective lens 202 is located "upstream" from the rotating polygon scanner 112, between the laser source 110 and the scanner 112. In a post-objective scanning system, the "upstream" objective lens 202 receives the laser beam as a stationary beam 102(b) rather than as the scanned laser beam 102(a) swept out by the rotating polygon scanner 112. Therefore, the objective lens 202 cannot correct the field curvature that is intrinsic to the polygon scanner 112 when the scanner is used with a converging input beam. Consequently, the image spots formed by the objective lens 202 are focused along a curved image surface 204 rather than along a straight scan line 106 as shown in FIG. 1. An image scanned across the photosensitive element 104 in such a post-objective scanning system will not be focused properly. Conventional imaging systems therefore use a pre-objective scanning configuration as shown in FIG. 1 in order to correct the image field curvature that would otherwise be created by a rotating polygon scanner 112.

Although conventional imaging systems using pre-objective scanning (e.g., FIG. 1) can effectively correct field curvature, such systems have various disadvantages. One disadvantage is the increased complexity of the design of the objective lens 108. An objective lens in a pre-objective scanning system must be able to tightly control X and Y spot position, field curvature, and wavefront quality across a wide image field. Polished glass and molded plastic elements used in such lenses typically have strongly aspheric surfaces, making the lenses challenging to design and difficult to manufacture. The cost of tooling needed to produce one of the large molded plastic lens elements typically exceeds one hundred thousand dollars. The large part size, long mold cycle time and tight tolerances contribute to a high per-part manufacturing cost. Pre-objective scan lens designs which satisfy all of the applicable performance requirements are highly constrained, limiting the lens designer's ability to extend existing lens designs to future printers having even wider fields and more scanning beams.

Another disadvantage of conventional imaging systems that use pre-objective scanning is an inability to compensate for system variations that can reduce print quality. As is well-known in the field of laser scanner design, the "focal plane" produced by the scan lens in a pre-objective scanning system generally consists of two independently curved focal surfaces, one for each of the two astigmatic focal directions. In many laser scanner designs, the uncorrected residual curvature of these focal surfaces is only slightly less than the optical system's allowable focus error (depth of focus), thereby reducing the system's tolerance to defocus due to other causes. For example, laser wavelength can vary for a particular laser diode (e.g., 110 of FIG. 1) as a function of applied power. Variations in laser wavelength may change the effective focal length of the optical system, causing a shift in the axial position of the focal surface and increasing the amount of residual field curvature that goes uncorrected by the objective lens. Time-dependent variations caused by thermal expansion or mechanical deformation of a print mechanism can also change image field curvature or focal surface position relative to the surface of the photosensitive element. Tolerances associated with replacement of the photosensitive element, especially when that element is contained within a replaceable cartridge or other subassembly, also contribute to focus error. Current imaging systems that use pre-objective scanning cannot compensate for such variations. All of these sources of focus error become more problematic in higher resolution scanning systems with increased numerical aperture and correspondingly reduced depth of focus.

Accordingly, the need exists for a way to correct field curvature and other focus errors in a laser imaging system that does not require the significant expense associated with the design and manufacture of objective lenses in current pre-objective scanning systems. The need also exists for a way to correct residual field curvature in a pre-objective scanner having an objective lens that only partially corrects field curvature. Such residual field curvature can exist, for example, when a simplified scan lens design is used or when the required performance level of the scanning system exceeds the capabilities of the best achievable scan lens design.

SUMMARY

A laser imaging system dynamically positions optical components to maintain a focused image spot along the surface of a photosensitive element as a rotating scanner scans an image field.

BRIEF DESCRIPTION OF THE DRAWINGS

The same reference numbers are used throughout the drawings to reference like components and features.

DETAILED DESCRIPTION

Overview

The following discussion is directed to systems and methods that dynamically correct field curvature and other focus errors in imaging systems that use rotating scanners to scan an image field. The dynamic correction controls the curvature of an image field such that focus is maintained across the width of a photosensitive element as a rotating scanner scans the field. The described systems and methods enable the use of post-objective scanning configurations in which the complexity and expense of objective lenses is significantly reduced. The described systems and methods also enable the use of pre-objective scanning configurations having a simplified scan lens which only partially corrects field curvature or having a conventional scan lens which cannot fully correct field curvature in an extended performance system due, for example, to increased scan line length, the use of multiple lasers in a laser array or the reduced depth of focus in a high-resolution system.

Exemplary Environment

Figure 1:
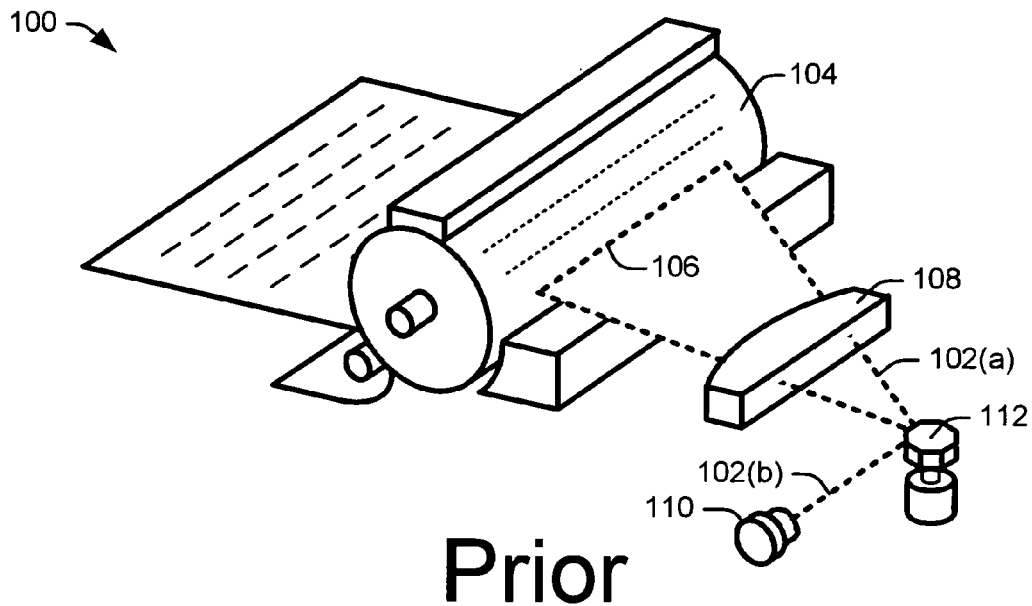
FIG. 1 illustrates a conventional EP process device implemented as a laser printer in a pre-objective scanning configuration.
Figure 2:
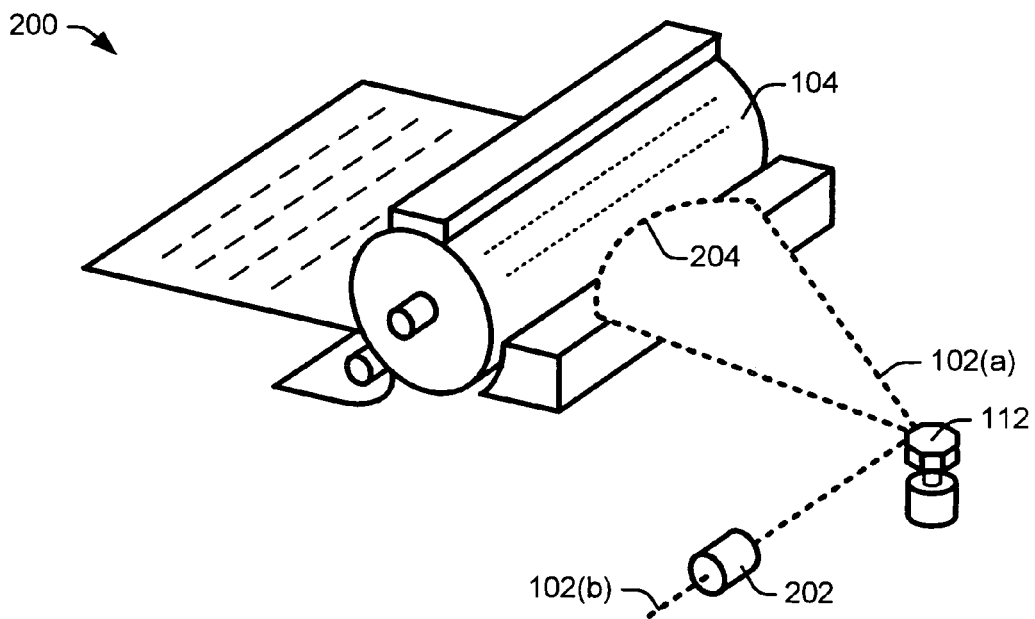
FIG. 2 illustrates a laser printer in a post-objective scanning configuration.
Figure 3:
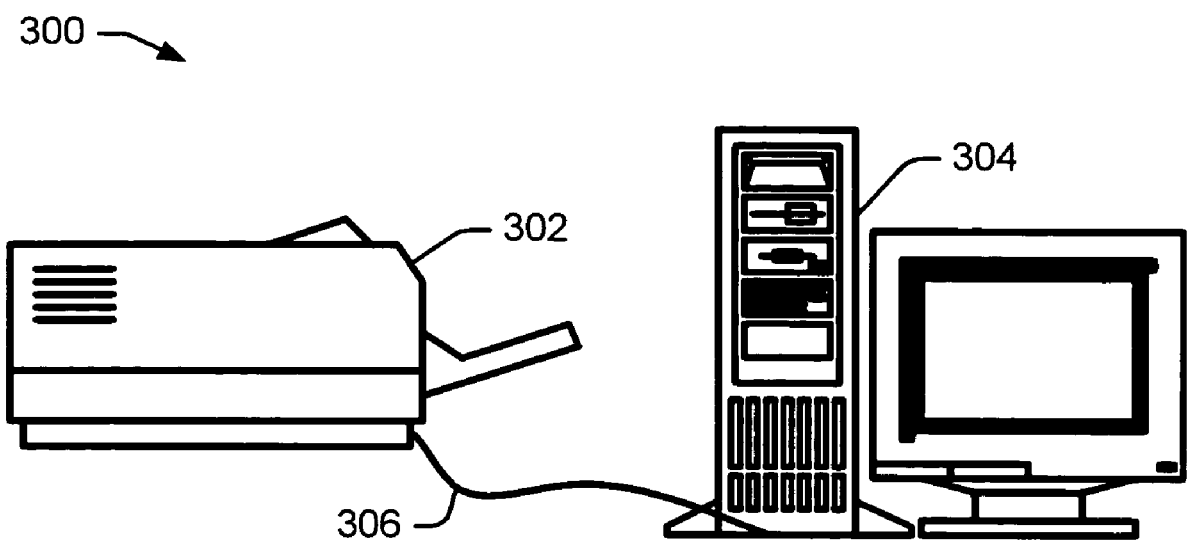
FIG. 3 illustrates an exemplary environment for implementing one or more embodiments of an imaging device that provides dynamic correction of field curvature.

FIG. 3 illustrates an exemplary environment for implementing one or more embodiments of an imaging device that provides dynamic correction of field curvature that is intrinsic to rotating polygon scanners. The environment 300 of FIG. 3 includes imaging device 302 operatively coupled to a host computer 304 through a network 306. The network 306 can be a direct or indirect link and may include, for example, a printer cable, a LAN (local area networks), a WAN (wide area networks), an intranet, the Internet, or any other suitable communication link. Network 306 can also include a wireless communications link such as an IR (infrared) or RF (radio frequency) link.

This disclosure is applicable to various types of imaging devices 302 that use a beam of light to record an image onto a photosensitive surface, such as devices capable of implementing an electrophotographic (EP) imaging/printing process for rendering PDL (page description language) data in printed form on a print medium. Therefore, imaging device 302 can include devices such as laser-based printers, photocopiers, scanners, fax machines, multifunction peripheral devices and other EP-capable devices.

Host computer 304 can be implemented as a variety of general purpose computing devices including, for example, a personal computer (PC), a server, a Web server, and other devices configured to communicate with imaging device 302. Host computer 304 typically provides a user with the ability to manipulate or otherwise prepare in electronic form, an image or document to be rendered as an image that is printed or otherwise formed onto a print medium by imaging device 302 after transmission over network 306. In general, host computer 304 outputs host data to imaging device 302 in a driver format suitable for the device 302, such as PCL or PostScript. Imaging device 302 converts the host data and outputs it onto an appropriate recording media, such as paper, film or transparencies.

Exemplary Embodiments

Figure 4:
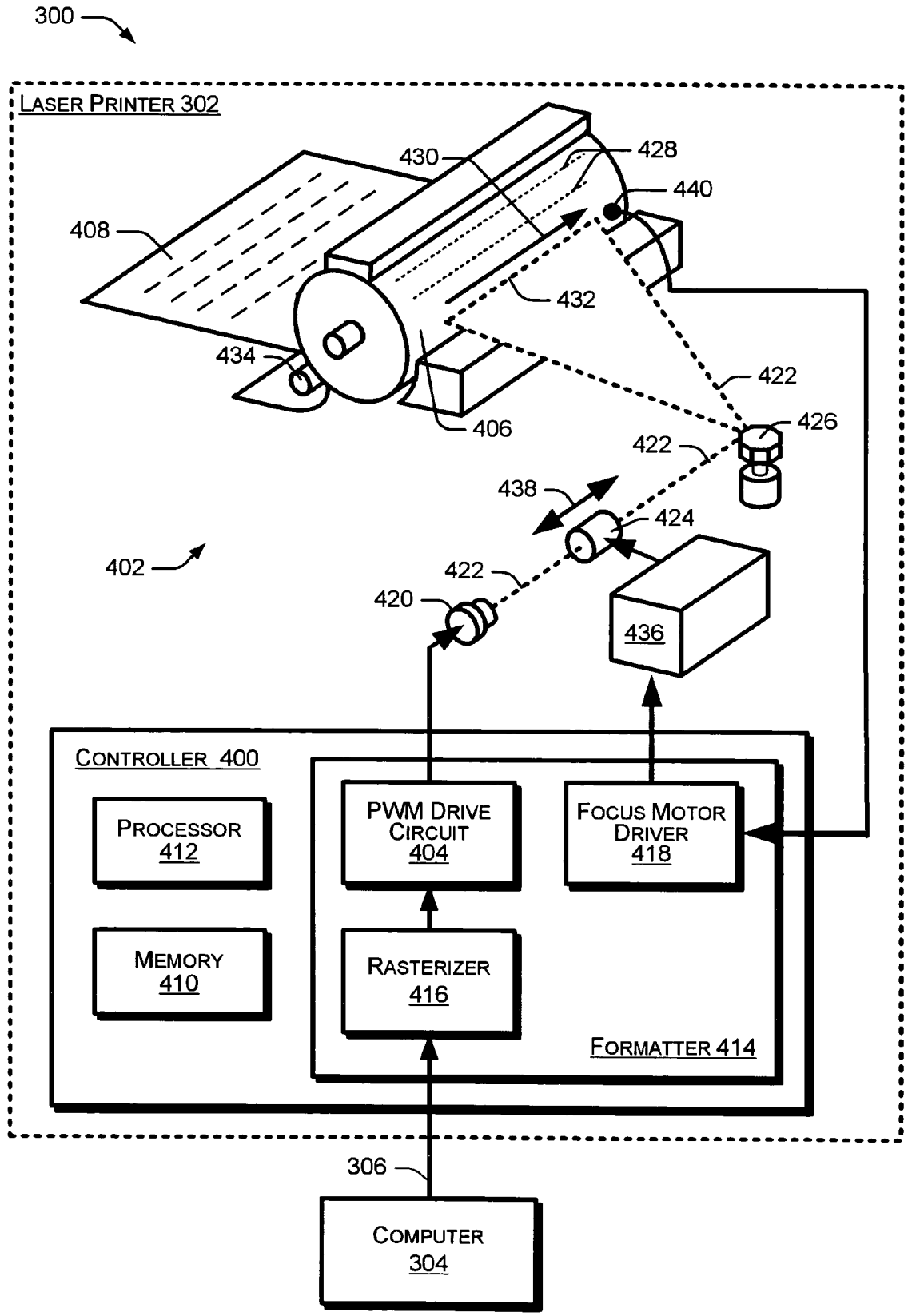
FIG. 4 is a functional and block diagram representation of one embodiment of an EP imaging device implemented as a laser printer.

FIG. 4 is a block diagram representation of an EP (electrophotographic) imaging device embodied as a laser printer 302. The block diagram representation of laser printer 302 includes an embodiment of a controller 400 and an embodiment of an image forming system 402. Computer 304 provides data, including print data, to controller 400. Laser printer 302 is generally disposed to modulating the operating frequencies of a pulse width modulator (PWM) drive circuit 404 to place pixels onto the surface of a photosensitive element such as photosensitive element 406 for forming an image to be printed onto a print medium such as paper 408.

Controller 400 is typically a printed circuit assembly that includes, for example, a memory 410 such as Random Access Memory (RAM) and/or non-volatile memory for holding an image to be printed and executable instructions, a microprocessor 412 for processing the image and instructions, and other general data formatting circuitry such as that illustrated in data formatter 414. Data formatter 414 is typically embodied as an ASIC (application specific integrated circuit) having various blocks of hardware implemented as logic gates. Thus, data formatter 414 includes a rasterizer block 416, a focus motor driver block 418, and a PWM (pulse width modulation) drive circuit block 404. Rasterizer block 416 and focus motor driver block 418 may also be implemented as firmware instructions executable on processor 412.

Rasterizer 416 converts print data from computer 304 into pixel/video data that PWM drive circuit 404 uses to form an image on print media 408. More specifically, PWM drive circuit 404 uses pixel data from rasterizer 416 to control the flow of drive current to a light source 420, such as laser diode 420, in image forming system 402. In response to the drive current, laser diode 420 generates a pulsating laser beam 422. The time period of the pulses of the laser beam 422 correspond to the time period of the pulses of the pixel/video data.

Image forming system 402 controls the movement of the pulsating beam 422 from the laser diode 420 across the surface of photosensitive element 406. In the described embodiment of FIG. 4, the pulsating laser beam 422 passes through an objective lens 424, reflects off the rotating polygon scanner 426, and is incident upon photosensitive element 406. As the pulsating beam 422 is scanned across the width of photosensitive element 406, it exposes regions or image spots in a scan line 428 on the surface of photosensitive element 406 that have a dimension in the direction 430 that the pulsating beam 422 is scanned. As discussed more thoroughly below, dynamic positioning of the objective lens 424 ensures that each image spot in a scan line 428 is well-focused across the scanned width 432 of the photosensitive element 406.

The dimension of the exposed regions or image spots in a scan line 428 corresponds to time periods of the pulses of the pixel/video data that is input to PWM drive circuit 404. Exposed regions have a different electrostatic charge per unit area than unexposed regions. The electrostatic charge differential forms a latent image on photosensitive element 406 that permits development of ink or toner to the photosensitive element 406 in a pattern corresponding to the latent image. Transfer roller 434 facilitates the transfer of ink or toner from photosensitive element 406 onto a print medium 408 in the form of a visible image.

Although FIG. 4 illustrates photosensitive element 406 in the form of a photosensitive drum 406, it is understood that other forms of photosensitive elements 406 are possible. For example, photosensitive element 406 can optionally be configured as a continuous, photosensitive belt or other photosensitive medium. It is also understood that although element 406 is typically a photoconductive element, other photosensitive media are possible. For example, element 406 can optionally be a photo-resistive, photographic or other light sensitive medium compatible with other printing processes. It is further understood that although FIG. 4 illustrates a scanner in the form of a rotating polygon scanner 426, other forms of scanner are possible. For example, rotating polygon scanner 426 can optionally be configured as a galvanometer scanner, a micro-machined silicon scanner, a rotating prism scanner, an acousto-optic or electro-optic scanner, or other scanning device.

As mentioned above, dynamic positioning of the objective lens 424 causes image spots in each scan line 428 to be focused across a flattened scanned width 432 along the photosensitive element 406. More specifically, a dynamic focus correction motor 436 positions the objective lens 424 back and forth along the optical axis of objective lens 424 (which generally corresponds to the nominal center line of laser beam 422) in such a way as to preserve the equality of lens equation #1:

$$\frac{1}{l_1} + \frac{1}{l_2} = \frac{1}{f} \qquad \text{Lens Equation \#1}$$

Figure 5:
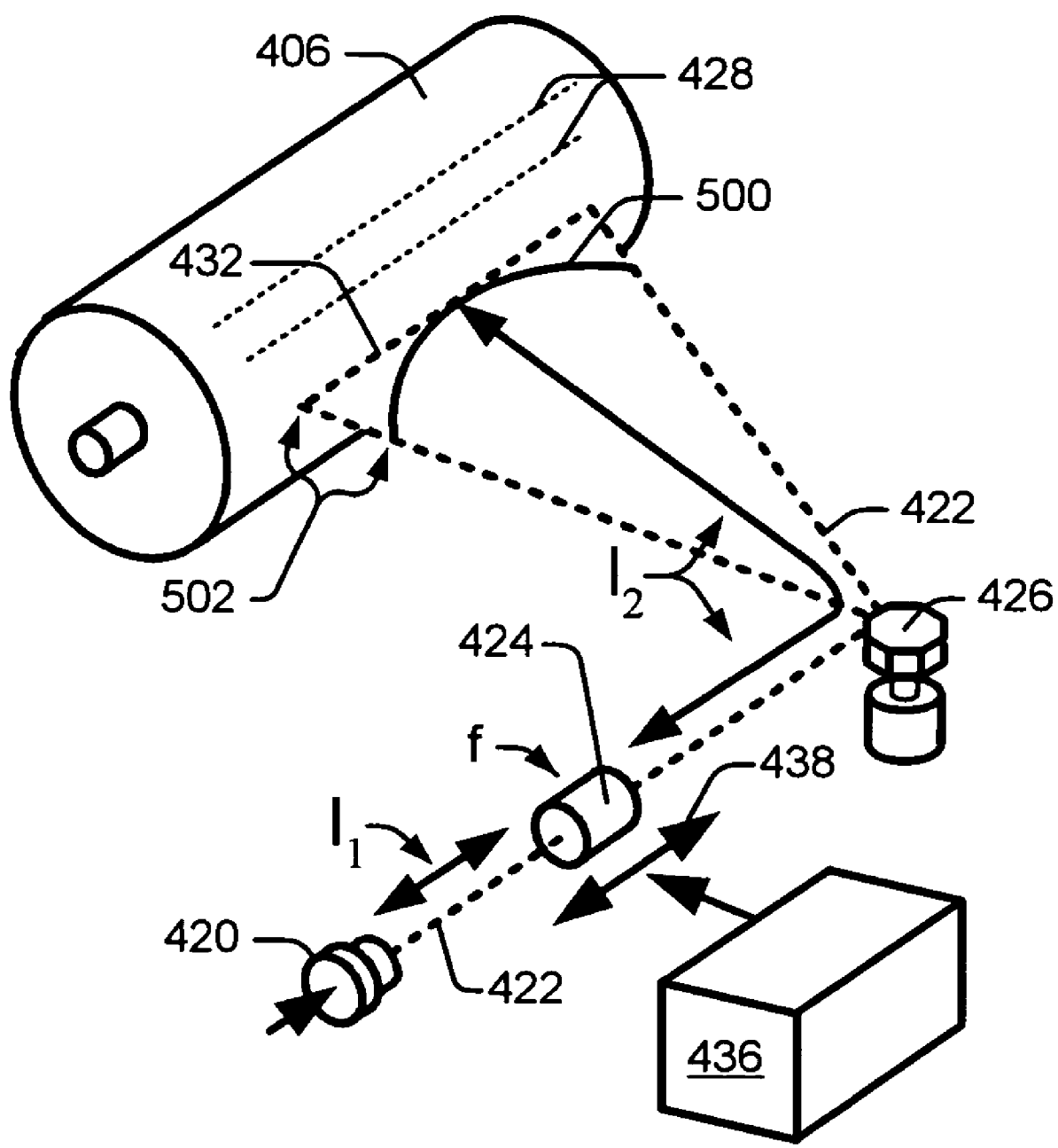
FIG. 5 illustrates the application of lens equation #1 parameters to the imaging device of FIG. 4.

In lens equation #1 (and as shown in FIG. 5), $l_1$ represents the object conjugate distance (i.e., the distance along the optical axis of objective lens 424 from the laser diode 420 to the first principal point of the objective lens 424), $l_2$ represents the image conjugate distance (i.e., the distance along the optical axis from the second principal point of objective lens 424 to the focused image spot near the photosensitive element 406), and f represents the focal length of the objective lens 424.

Arc 500 of FIG. 5 represents an image field that would be produced by the rotating polygon scanner 426 for a stationary objective lens 424. That is, for a stationary objective lens 424 the image conjugate distance, $l_2$, remains constant as the rotating polygon scanner 426 scans from one side of the photosensitive element 406 to the other. The image surface therefore curves in an arc 500 which is concave toward the scanner 426 as the scanner 426 scans from side to side. Without correction for field curvature, the curved image surface (i.e., arc 500) causes much of the image formed on photosensitive element 406 to be out of focus. If the image is well-focused near the center of the scanned arc 500, for example, it will be out of focus toward either end of the scanned width 432.

In a first embodiment, as generally illustrated in FIGS. 4 and 5, the curvature of the image surface (i.e., arc 500) is corrected by a dynamic focus correction motor 436 that adjusts the position of the objective lens 424 along its optical axis in synchronization with the rotation of the polygon scanner 426. Specifically, the linear position of the objective lens 436 is synchronized with the angular position of the active facet of polygon scanner 426 (i.e., the facet that is currently reflecting the laser beam). Consequently, objective lens 424 moves through one cycle of focus correction motion during the time one polygon facet passes through the beam to produce one scan line in a system having a single-element laser source. Dynamic focus correction motor 436 is typically an electromechanical voice coil actuator such as those used to focus objective lenses in optical disk drives (e.g., in compact disk players or digital video disk players), or some other type of linear actuator as is generally known in the art.

FIG. 5 illustrates the dynamic positioning of the objective lens 424 causing the parameters $l_1$ and $l_2$ (focal length f remains constant) to vary as the rotating polygon scanner 426 scans the width 432 of photosensitive element 406. The object conjugate distance, $l_1$, is chosen to be much smaller than the image conjugate distance, $l_2$. In general, dynamic focus correction motor 436 makes adjustments in the position of objective lens 424 to alter the distance $l_1$. As the distance $l_1$ is changed, the distance $l_2$ changes according to lens equation #1 above. Lens equation #1 shows that when $l_2$ is large compared to $l_1$, small changes in the distance $l_1$ result in much larger changes in the distance $l_2$ that effectively maintain a focused image field or scan line 428 along the surface of photosensitive element 406. More specifically, as the rotating polygon scanner 426 scans to either side of the width 432 of photosensitive element 406, the distance 502 (FIG. 5) between arc 500 and photosensitive element 406 is adjusted to zero by the dynamic focus correction motor 436. The dynamic focus correction motor 436 moves the objective lens 424 closer to laser diode 420 along a direction 438, which decreases the object conjugate distance $l_1$ and causes a corresponding but magnified increase in the image conjugate distance $l_2$. Specifically, the rate of change of $l_2$ with respect to $l_1$ is equal to $-(l_2/l_1)^2$, where the minus sign indicates that $l_2$ becomes larger as $l_1$ becomes smaller. If, for example, $l_2$ is chosen to be 20 times larger than $l_1$ during the design of the optical system, a 0.05 mm reduction in $l_1$ due to dynamic positioning of the objective lens 424 causes a 20.0 mm increase in $l_2$. The result is that the image surface being scanned by the rotating polygon scanner 426 becomes a flat surface which corresponds closely to the surface of the photosensitive element 406 along the scanned width 432, rather than the arc 500.

Referring again to FIG. 4, the dynamic focus correction motor 436 is controlled by a focus motor driver 418. Focus motor driver 418 generates a focus correction signal using an open-loop focus correction method or a partial-closed-loop focus correction method. The dynamic focus correction motor 436, focus motor driver 418 and the focus correction signal generally make up a motion control system configured to dynamically position the objective lens 424. In the open-loop focus correction method, a focus correction signal is first determined as a function of polygon angular position, typically in a calibration step during printer manufacture. The focus correction signal may be independently determined for each facet of a polygon scanner 426 in a given laser printer 302, allowing the correction of facet-to-facet focus errors caused by irregularities in the polygon itself. This focus-error correction signal is then digitized and may be written to a look-up-table (LUT) (not shown) or otherwise stored in the printer or a host computer. In the embodiment of FIG. 4, focus motor driver 418 comprises the stored focus correction signal. Focus motor driver 418 is used by the printer 302 to re-create a properly synchronized real-time focus correction signal and to apply that signal to the focus motor 436, enabling open-loop focus correction. Such open-loop focus correction does not require a focus sensor. In an enhanced open-loop focus correction method, a position sensor (not shown) on the focus motor 436 allows the focus motor driver 418 to close a position servo loop around the focus motor 436 to provide a more accurate open-loop correction of focus errors along the scan path 432 at the photoconductor 406.

In a partial-closed-loop focus correction method, a focus error is determined by a focus sensor 440 near an end of a scan line 432. A focus motor driver 418 in the printer 302 uses this measured focus error information in combination with a predetermined focus correction signal (as described above) to create an updated focus correction signal which is applied to the focus motor 436. The updated focus correction signal can be determined and applied as frequently as every scan. This method has the advantage of being able to correct for focus drift after initial calibration of a printer 302.

Focus motor driver 418 synchronizes the linear motion of focus motor 436 with the rotational motion of polygon scanner 426 using a polygon position signal such as a start of scan signal produced by an optical start-of-scan detector (not shown). The start-of-scan detector detects the position of the scanned laser spot as the scanned laser beam approaches the beginning of each scan line, as is well known in the field of laser printer design. Alternatively, the polygon position signal can be obtained from a polygon position sensor that detects the position of the polygon. A polygon position sensor can also determine which facet of the polygon scanner is currently in use, enabling a different predetermined focus correction signal to be used for each facet of the polygon scanner, thus correcting focus errors due to polygon irregularities which vary from facet-to-facet as the polygon scanner rotates.

The dynamic positioning of an objective lens 424 in a post-objective scanning configuration as generally illustrated in the first embodiment of FIGS. 4 and 5, corrects the image field curvature that is intrinsic to a rotating polygon scanner 426. In addition to correcting field curvature, dynamic positioning of an objective lens 424 can correct various other focus errors that are common in laser imaging systems. For example, such dynamic correction can compensate for focus errors related to variations in laser wavelength caused, by changes in laser power. Focus errors related to the thermal expansion or mechanical deformation of a print mechanism or the replacement of a photosensitive element can also be corrected by the dynamic positioning of an objective lens 424 in a post-objective scanning configuration as generally described with respect to the embodiment of FIGS. 4 and 5.

Figure 6:
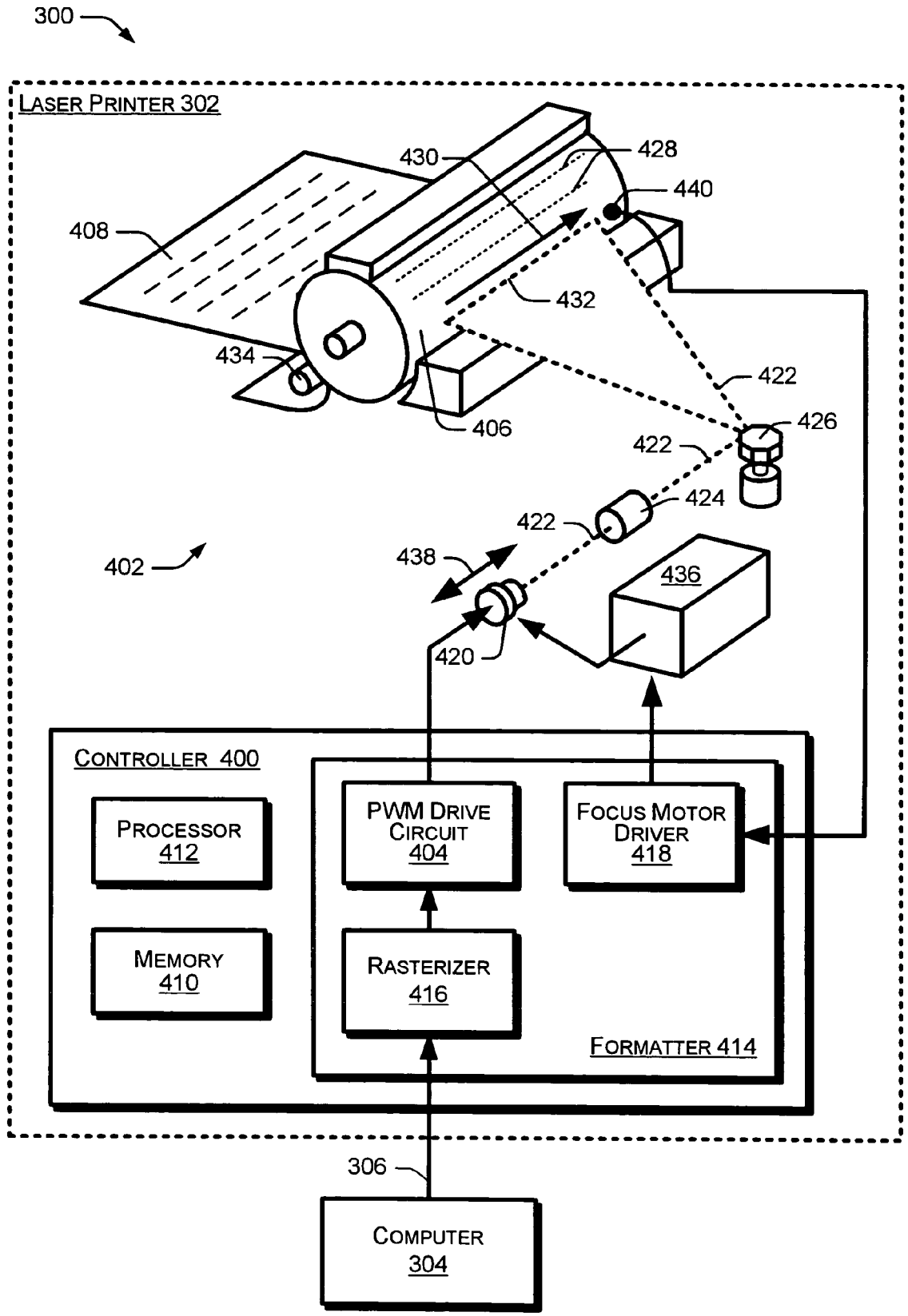
FIG. 6 is a functional and block diagram representation of another embodiment of an EP imaging device implemented as a laser printer.

FIG. 6 illustrates another embodiment configured to dynamically correct field curvature and other focus errors in a post-objective scanning configuration. The embodiment of FIG. 6 is configured in the same manner as the embodiment of FIG. 4 except that error correction is achieved by dynamic positioning of a laser source 420 instead of an objective lens 424.

Accordingly, FIG. 6 shows the dynamic focus correction motor 436 being applied to the laser source 420. The focus motor 436 adjusts the position of the laser source 420 along the optical axis of objective lens 424 in a direction 438 parallel to the optical axis and generally parallel to the nominal center line of laser beam 422 and in synchronization with the rotation of the polygon scanner 426.

Figure 7:
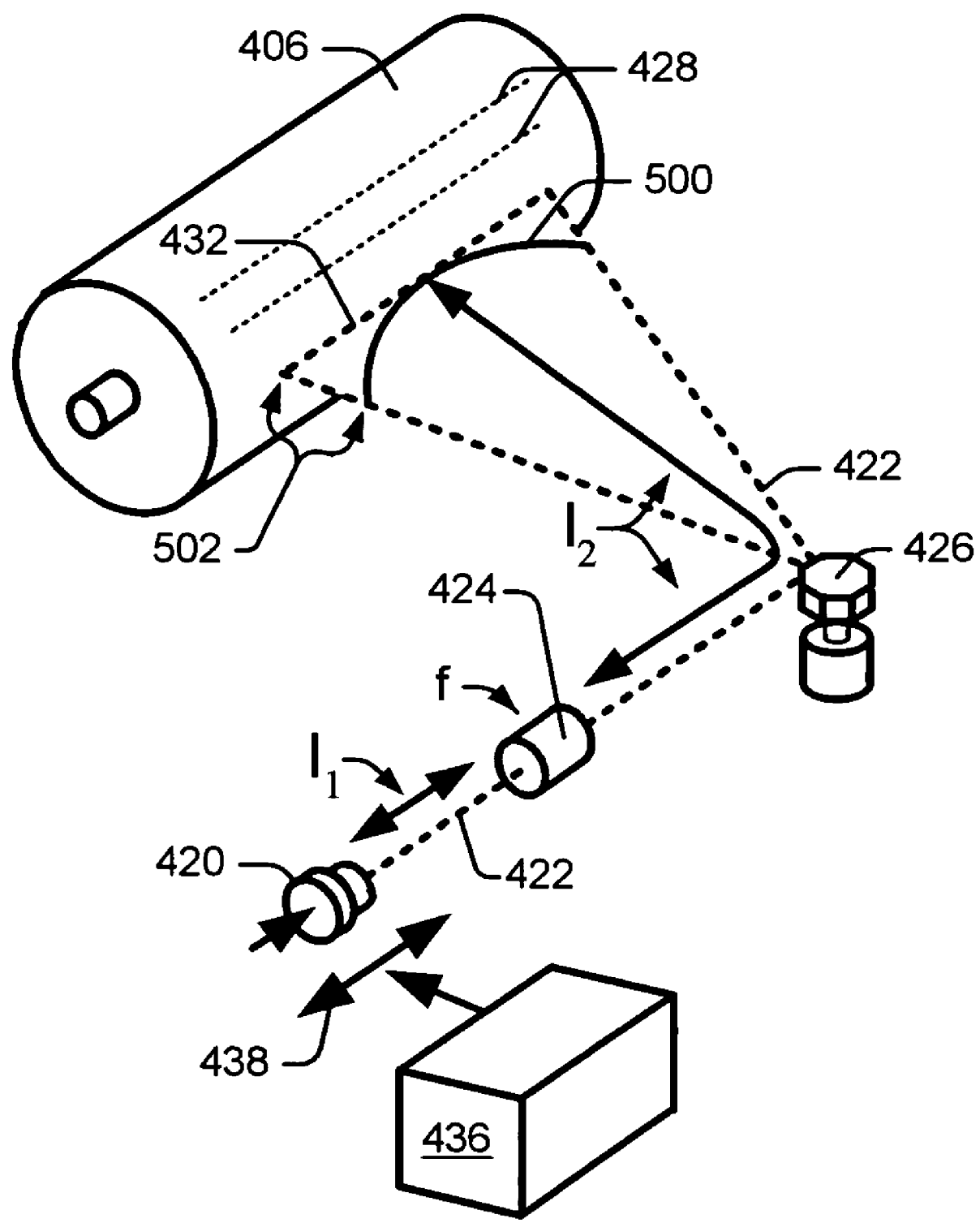
FIG. 7 illustrates the application of lens equation #1 parameters to the imaging device of FIG. 6.

FIG. 7 is analogous to FIG. 5 discussed above, and illustrates the dynamic positioning of the laser source 420 in synchronization with the rotation of polygon scanner 426 in order to vary the parameters $l_1$ and $l_2$ of lens equation #1 and maintain a focused image field or scan line 428 along the surface of photosensitive element 406. As the rotating polygon scanner 426 scans to either side of the width 432 of photosensitive element 406, the distance 502 between arc 500 and photosensitive element 406 is adjusted to zero by the dynamic focus correction motor 436. The dynamic focus correction motor 436 moves the laser source 420 closer to the objective lens 424 along a direction 438 as the scanner 426 scans toward the edges of the width 432, thereby decreasing the object conjugate distance $l_1$ and causing a corresponding but magnified increase in the image conjugate distance $l_2$. The result is that the image surface being scanned by the rotating polygon scanner 426 is flattened as necessary to conform to the surface of the photosensitive element 406 along the scanned width 432.

Referring again to FIG. 6, the dynamic focus correction motor 436 can be controlled by error signals generated using both an open-loop focus correction method and a partial-closed-loop focus correction method as described above with respect to the embodiment of FIGS. 4 and 5. Thus, in the embodiment of FIG. 6, focus motor driver 418 comprises a focus correction signal and is used by the printer 302 drive to the focus motor 436, enabling open-loop focus correction through dynamic positioning of laser source 420.

In the partial-closed-loop focus correction method, a focus error is determined by a focus sensor 440 near an end of a scan line 432 as described above with respect to the FIG. 4 embodiment. A focus motor driver 418 uses the measured focus error information in combination with a predetermined focus correction signal to create an updated focus correction signal which is applied to the focus motor 436 to control the dynamic positioning of laser source 420.

Figure 8:
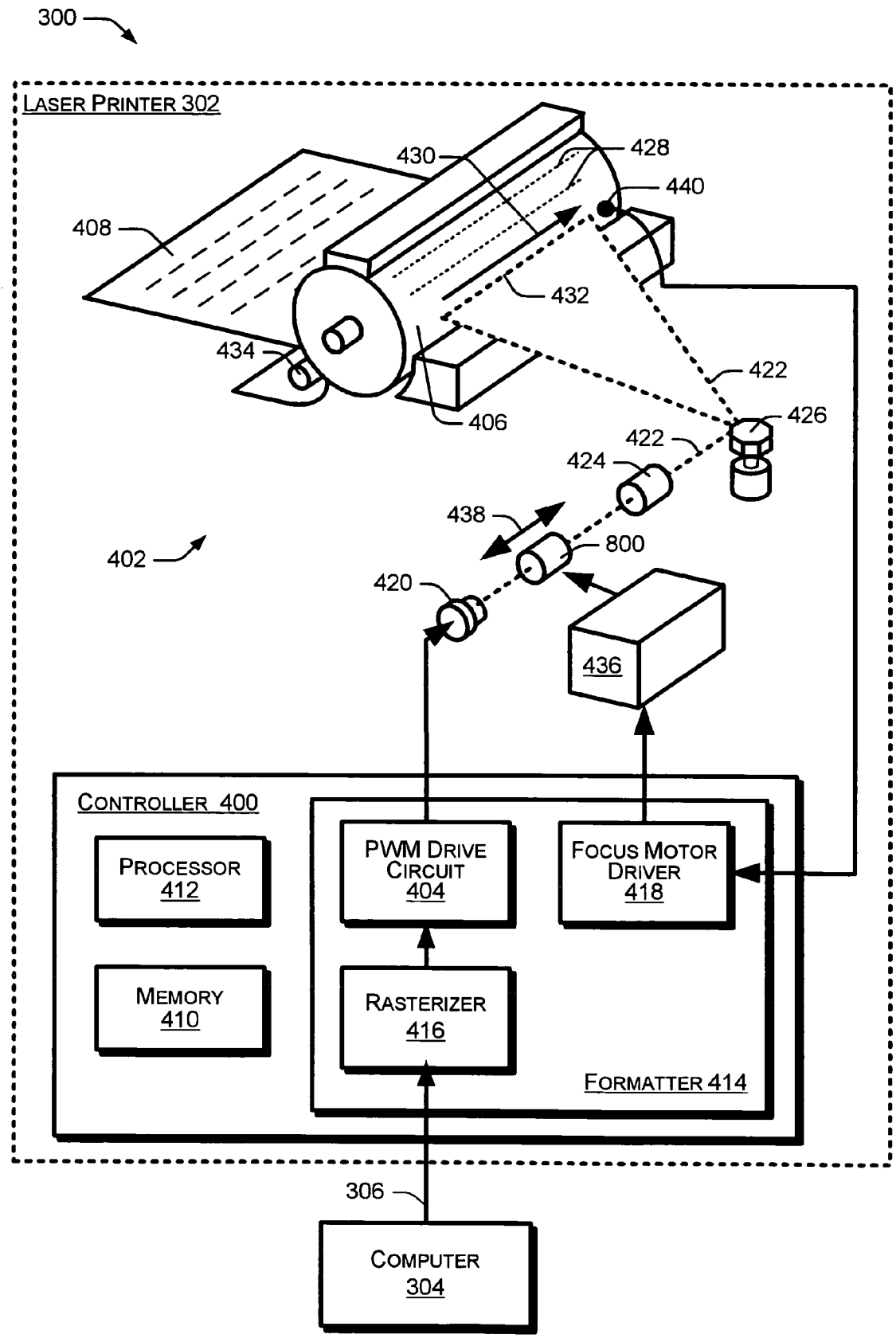
FIG. 8 is a functional and block diagram representation of another embodiment of an EP imaging device implemented as a laser printer.

FIG. 8 illustrates another embodiment configured to dynamically correct field curvature and other focus errors in a post-objective scanning configuration. The embodiment of FIG. 8 is configured in a manner similar to that of the embodiments of FIGS. 4 and 6 described above, except that the embodiment of FIG. 8 includes a collimating lens 800, and error correction is achieved by dynamically positioning the collimating lens 800 instead of the laser source 420 or the objective lens 424.

Figure 9A:
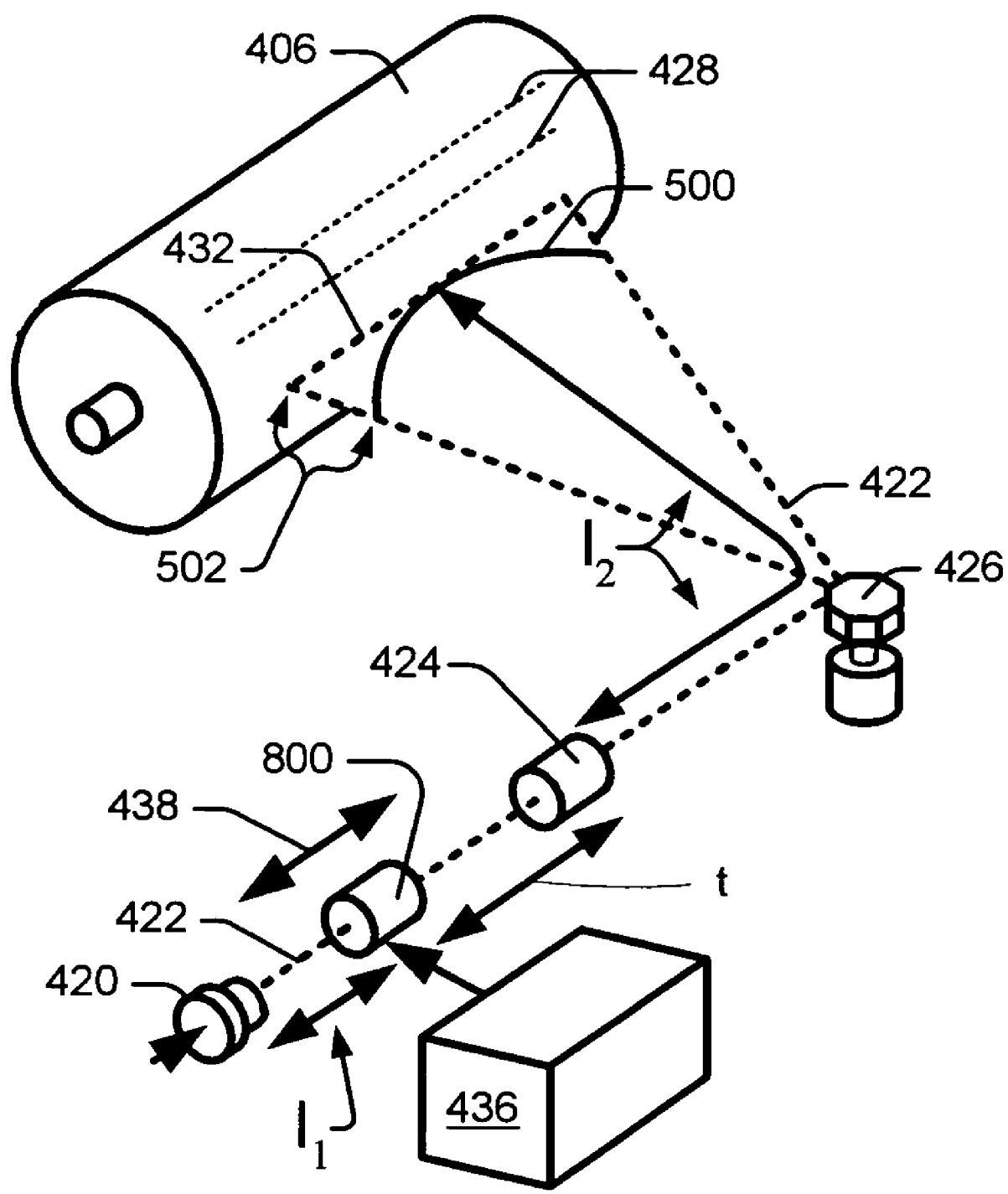
FIG. 9a illustrates the application of lens equation #2 parameters to the imaging device of FIG. 8.

Accordingly, FIG. 8 shows the dynamic focus correction motor 436 being applied to collimating lens 800. The focus motor 436 adjusts the position of the collimating lens 800 along the common optical axis of collimating lens 800 and objective lens 424 in a direction 438 parallel to the optical axis and generally parallel to the nominal center line of laser beam 422 and in synchronization with the rotation of the polygon scanner 426. FIG. 9a is analogous to FIGS. 5 and 7 discussed above, and illustrates the dynamic positioning of the collimating lens 800 in synchronization with the rotation of polygon scanner 426 in order to vary the distance parameters $l_1$ and $l_2$ of lens equation #2 and maintain a focused image field or scan line 428 along the surface of photosensitive element 406. Lens equation #2 is a modified form of lens equation #1 that applies to a two lens imaging system such as that of FIG. 9a:

$$1/(l_1+(f \times t/f_o))+1/(l_2+(f \times t/f_c))=1/f \text{ Where: } f=(f_c \times f_o)/(f_c+f_o-t)$$

Lens Equation #2

The system illustrated in FIG. 9a includes a collimating lens 800 having a focal length $f_c$ and an objective lens 424 having a focal length $f_o$. The collimating lens and objective lens are separated by a distance t, where t is measured from the second principal point of the collimating lens to the first principal point of the objective lens, as is well known in the field of optics. The object conjugate distance $l_1$ is now measured from the laser to the first principal point of collimating lens 800 and the image conjugate distance $l_2$ is now measured from the second principal point of objective lens 424 to the focused image spot at the photoconductor. As the rotating polygon scanner 426 scans to either side of the width 432 of photosensitive element 406, the distance 502 between arc 500 and photosensitive element 406 is nominally adjusted to zero by the dynamic focus correction motor 436. The dynamic focus correction motor 436 moves the collimating lens 800 closer to objective lens 424 laser along a direction 438 as the scanner 426 scans toward the edges of the width 432, thereby decreasing the object conjugate distance $l_1$ and causing a corresponding but magnified increase in the image conjugate distance $l_2$. The result is that the image surface being scanned by the rotating polygon scanner 426 becomes a flat surface which corresponds closely to the surface of the photosensitive element 406 along the scanned width 432 rather than the arc 500.

Referring again to FIG. 8, the dynamic focus correction motor 436 can be controlled by error signals generated using both an open-loop focus correction method and a partial-closed-loop focus correction method as described above with respect to the embodiments of FIGS. 4 through 7. Thus, in the embodiment of FIG. 8, focus motor driver 418 comprises a focus correction signal and is used by the printer 302 drive to the focus motor 436, enabling open-loop focus correction through dynamic positioning of the collimating lens 800.

In the partial-closed-loop focus correction method, a focus error is determined by a focus sensor 440 near an end of a scan line 432 as described above with respect to the embodiments of FIGS. 4 and 6. A focus motor driver 418 uses the measured focus error information in combination with a predetermined focus correction signal to create an updated focus correction signal which is applied to the focus motor 436 to control the dynamic positioning of collimating lens 800.

Figure 9B:
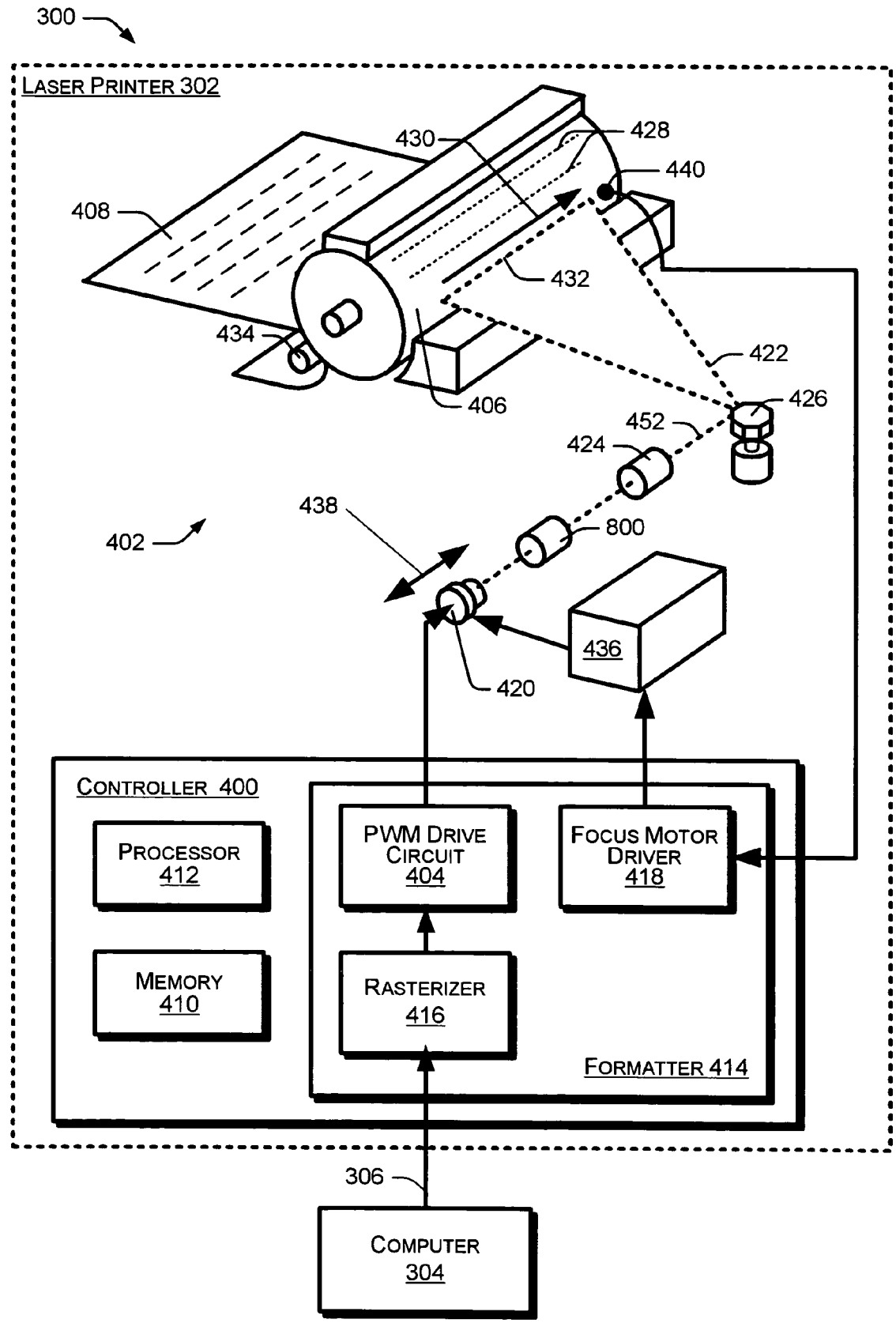
FIG. 9b is a functional and block diagram representation of a doubly-telecentric embodiment of an EP imaging device implemented as a laser printer.

FIG. 9b illustrates yet another embodiment configured to dynamically correct field curvature and other focus errors in a post-objective scanning configuration. The embodiment of FIG. 9b is configured in a manner similar to that of the embodiment of FIG. 8 described above, except that the collimating lens 800 and objective lens 424 are arranged to form a doubly-telecentric optical system and focus error correction is achieved by dynamically positioning the laser source 420. In the embodiment of FIG. 9b, laser source 420 is a multi-element laser array which produces multiple independently-modulated laser beams.

Each laser beam forms a corresponding focused image spot, enabling multiple scan lines to be simultaneously written on photosensitive element 406. Laser array 420 is dynamically positioned along an optical axis 452 by focus correction motor 436, thereby changing the value of the object conjugate distance $l_1$ in lens equation #2 and causing a corresponding change in the image conjugate distance $l_2$ according to lens equation #2. As will be described more fully below, such changes in $l_1$ and $l_2$ do not affect the separation between focused image spots in the image plane. Consequently, field curvature and other focus errors are corrected in a system having multiple laser elements while constant spacing is maintained between the multiple focused image spots formed on photosensitive element 406. Scan lines formed by the multiple focused image spots corresponding to the multiple emitters in the laser array will thereby have constant spacing over the width of the scanned field enabling the formation of multiple uniformly spaced scan lines during the passage of each facet of polygon scanner 426.

Accordingly, FIG. 9b shows the dynamic focus correction motor 436 being applied to multi-element laser array 420. The focus motor 436 adjusts the position of the laser array 420 along the optical axis 452 of collimating lens 800 and objective lens 424 in a direction 438 and in synchronization with the rotation of the polygon scanner 426.

Figure 9C:
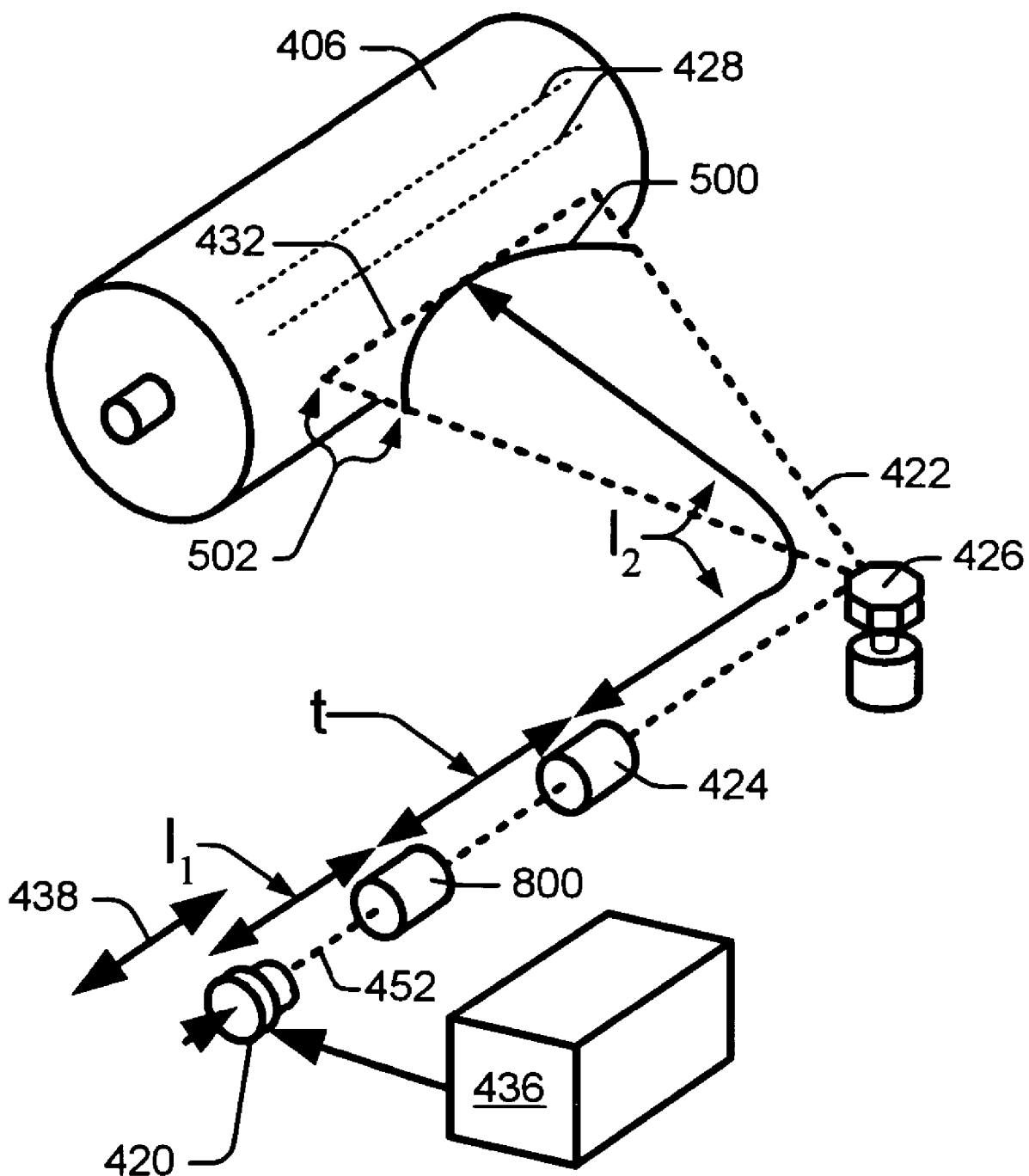
FIG. 9c illustrates the application of lens equation #2 parameters to the imaging device of FIG. 9b.

FIG. 9c is analogous to FIGS. 5, 7 and 9a discussed above, and illustrates the dynamic positioning of the laser source 420 in synchronization with the rotation of polygon scanner 426 in order to vary the distance parameters $l_1$ and $l_2$ of lens equation #2 and maintain a focused image field or scan line 428 along the surface of photosensitive element 406.

Figure 9D:
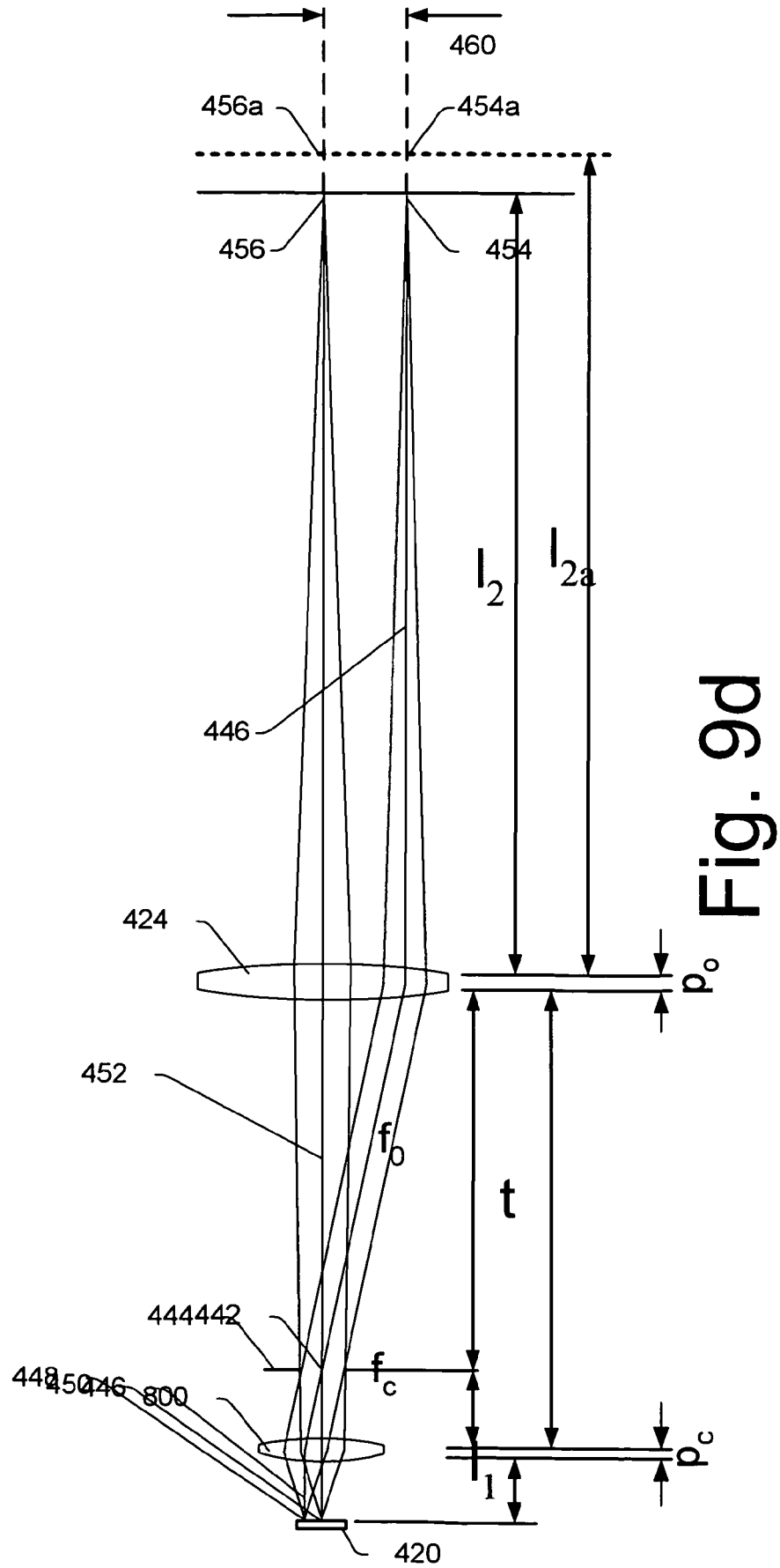
FIG. 9d illustrates exemplary optical ray paths for the doubly-telecentric optical system of FIGS. 9b and 9c.

FIG. 9d illustrates exemplary optical ray paths for the doubly-telecentric optical system of FIG. 9b. Beam reflections at polygon scanner 426 have been omitted to facilitate description of the imaging system. The doubly-telecentric optical system comprises collimating lens 800 having a back focal point located at a point 442. The optical system further comprises objective lens 424 having a front focal point that is aligned to substantially coincide with the back focal point of the collimating lens 800 at point 442. An aperture stop 444 is centered at point 442. The aperture stop determines which of the rays emitted by each laser element will pass through the optical system, thereby establishing the size and cross-sectional shape of the beam of light from each laser element that contributes to the formation of an image spot. Collimating lens 800, objective lens 424 and aperture stop 444 are aligned to be mutually coaxial, their common axis being optical axis 452. This optical arrangement, wherein two lenses have coincident focal points which also coincide with the location of the system aperture stop, constitutes a doubly-telecentric optical system. It will be apparent to anyone skilled in the field of optics that the entrance pupil and the exit pupil of a doubly-telecentric optical system are both located at infinity. Accordingly, an off-axis laser element 448, within laser source 420, emits a chief ray 446 which, by definition, passes through the center of the aperture stop 444. Chief ray 446 propagates parallel to the optical axis before entering collimating lens 800 and again propagates parallel to the optical axis after emerging from the objective lens 424. An on-axis laser element 450, also within multi-element laser source 420, is located on the optical axis 452 and emits a "degenerate" chief ray which coincides with the optical axis. The optical system forms a focused spot at an off-axis point 454 which is an image of off-axis laser element 448. Similarly, the optical system forms a focused spot at an on-axis point 456 which is an image of on-axis laser element 450.

During focus correction, laser elements such as 448 and 450 within laser array 420 are moved parallel to the optical axis, thereby moving along their respective chief rays which are also parallel to the optical axis due to the telecentricity of the optical system. Consequently, the position and direction of the chief ray emitted by each laser element are unaffected by the motion of the laser array during focus correction. As a result, the chief ray for each laser element remains parallel to the optical axis after emerging from the objective lens, and image points such as 454 and 456 also move parallel to the optical axis as they move along their respective chief rays during focus correction. For example, when laser source 420 is moved closer to collimator 800 during focus correction, object conjugate distance $l_1$ is reduced. According to equation #2, such a reduction in $l_1$ causes an increase in image conjugate distance $l_2$ as shown in FIG. 9*d* by an increased image conjugate distance $l_{2a}$. Consequently, the distance 460 between image point 454 and the optical axis 452 does not depend on the axial position of the laser source and is therefore unaffected by focus correction. The distance 460 between image points 454 and 456 is therefore the same as the distance between the focus-shifted image points 454*a* and 456*a*, and scan line spacing does not change across the scanned field as field curvature and other focus errors are corrected.

Exemplary Methods

Example methods for correcting field curvature and other focus errors in an electrophotographic (EP) imaging system such as described above will now be described with primary reference to the flow diagrams of FIGS. 10-12. The methods apply generally to the exemplary embodiments discussed above with respect to FIGS. 3-9*d*. The elements of the described method may be performed by any appropriate means including, for example, by hardware logic blocks on an ASIC or by the execution of processor-readable instructions defined on a processor-readable medium, such as a disk, a ROM or other such memory device. Furthermore, the elements of the described method may be performed on any appropriate device in communication with the EP system. Therefore, although the example methods are generally described as being implemented on an EP device, it is to be understood that various elements of the methods, such as calculations made according to lens equations, and so on, might also be implemented on devices peripheral to an EP device. An example would include a personal computer coupled to an EP device and performing various calculations of object positions.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM), a read-only memory (ROM), an erasable programmable-read-only memory (EPROM or Flash memory), an optical fiber (optical), and a portable compact disc read-only memory (CDROM) (optical).

Figure 10:
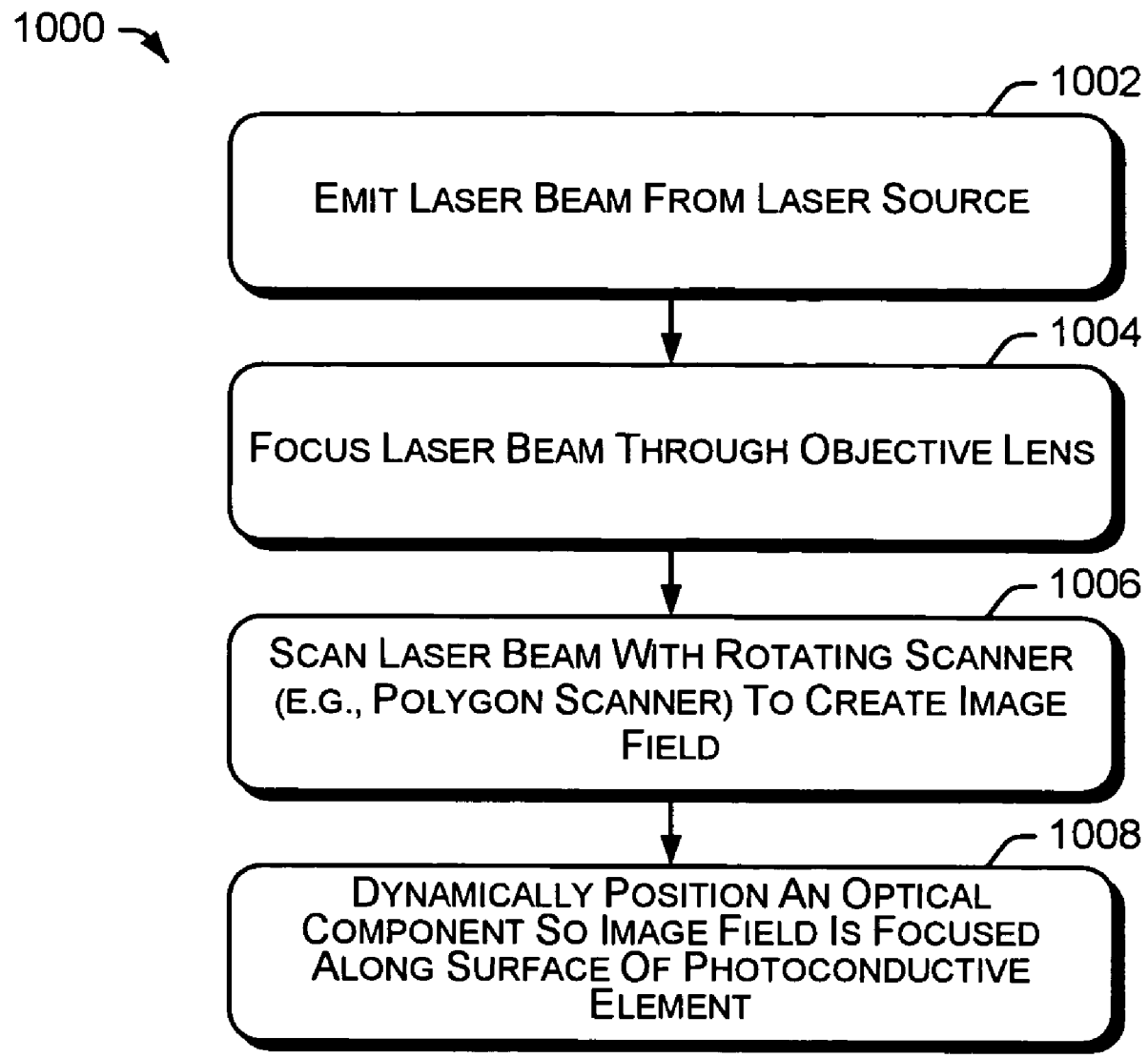
FIG. 10 is a flow diagram illustrating an example method for correcting field curvature.

FIG. 10 shows an exemplary method 1000 for correcting field curvature and other focus errors in an EP imaging system having a post-objective scanning configuration. At block 1002, a laser source in an EP system emits a laser beam. The laser source is typically a laser diode or a multi-element laser diode array. At block 1004, the laser beam is focused by an objective lens. Focusing the laser beam by an objective lens converges the beam to a focused image spot. At block 1006, the laser beam is scanned by a rotating scanner to form an image field. At block 1008, an optical component of the EP imaging system is dynamically positioned along the optical axis to flatten the image field so that the scanning beam forms a well-focused spot along a scan line on the surface of a photosensitive element over the width of the image field. The optical component can include the objective lens, the laser source, or a collimating lens located between the objective lens and the laser source. For each position of the rotating scanner, a corresponding position is determined for the optical component and a focus motor moves the optical component to that position. Movement of the optical component along the optical axis maintains the flatness of the image field, enabling the image field to conform to the surface of the photosensitive element along the scan line.

Figure 11:
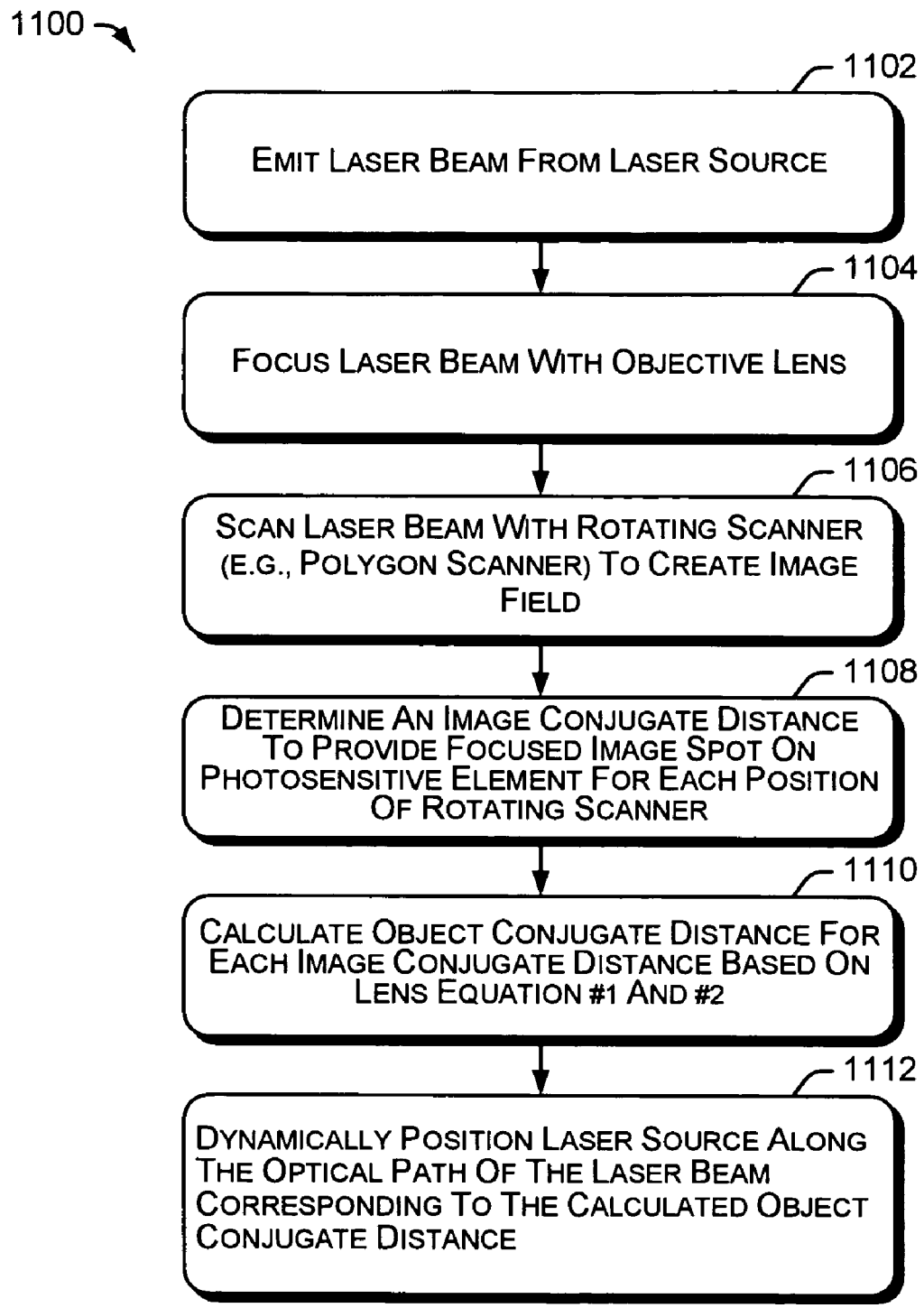
FIG. 11 is a flow diagram illustrating another example method for correcting field curvature.

FIG. 11 shows another exemplary method 1100 for correcting field curvature and other focus errors by dynamically positioning the laser source in an EP imaging system having a post-objective scanning configuration. At block 1102, a laser source (e.g., a laser diode or a multi-element laser diode array) in an EP system emits a laser beam. At block 1104, the laser beam is focused by an objective lens, converging the beam to a focused image spot. At block 1106, the laser beam is scanned by a rotating scanner to form an image field. At block 1108, a required image conjugate distance is determined for each position of a rotating scanner that will provide a focused image spot along the surface of a scanned photosensitive element. The image conjugate distance is the distance between the objective lens and the photosensitive element, measured along the optical axis, and is typically determined for each facet of a polygon scanner in a given imaging system in a calibration step during manufacturing. A required image conjugate distance for each position of the rotating scanner is typically digitized and written to a look-up-table (LUT) or otherwise stored in the imaging device. At block 1110, a corresponding object conjugate distance is calculated for each image conjugate distance. As noted above, an object conjugate distance might be calculated on an EP device itself, or alternatively, it might be calculated on and/or transferred to the EP device from a peripheral device such as personal computer. Such peripheral devices might provide pre-calculated object distances for each polygon position that are stored in a LUT, for example, and transferred to the EP device. The calculation is made according to lens equation #1 for systems such as that illustrated in FIG. 7 having a single lens between the laser source and the polygon scanner:

$$\frac{1}{l_1} + \frac{1}{l_2} = \frac{1}{f} \qquad \text{Lens Equation \#1}$$

where $l_1$ represents the object conjugate distance (i.e., the distance from the laser source to the objective lens), $l_2$ represents the image conjugate distance (i.e., the distance from the objective lens to the surface of the photosensitive element), and f represents the focal length of the objective lens. The object conjugate distance calculation is made according to lens equation #2 for systems like that illustrated in FIG. 9*c* having a collimator and an objective lens between the laser diode and the polygon scanner:

$$1/(l_1 + (f \times t/f_o)) + 1/(l_2 + (f \times t/f_c)) = 1/f \qquad \text{Lens Equation \#2}$$

Where: $f = (f_c \times f_o)/(f_c + f_o - t)$

At block 1112, the laser source is dynamically positioned along the optical axis corresponding to the calculated object conjugate distance. In this case, the laser source would be dynamically positioned to be a distance from the objective lens (or collimator lens for systems having a collimator and an objective lens between the laser diode and the polygon scanner) that is equal to the calculated object conjugate distance.

Figure 12:
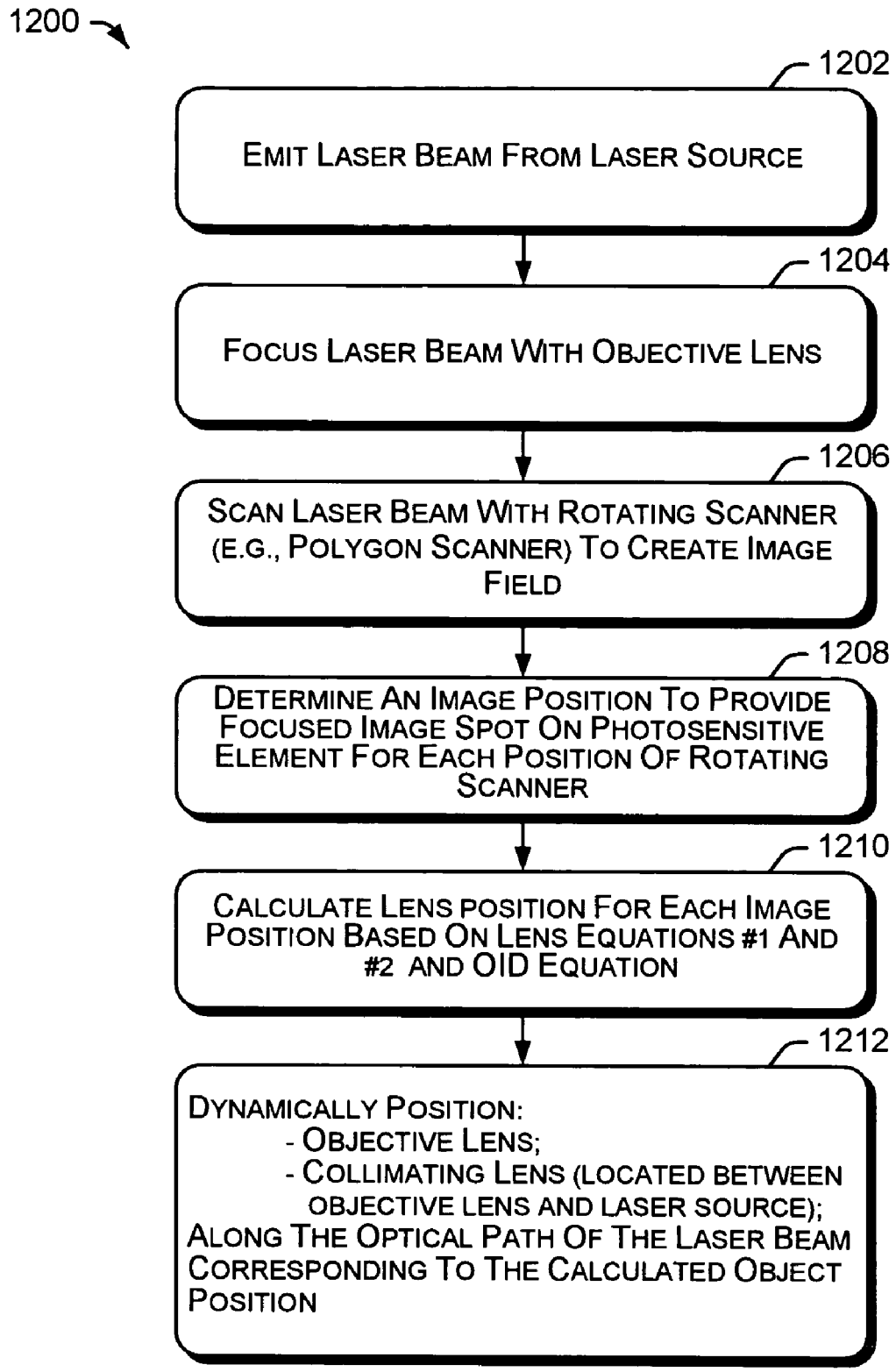
FIG. 12 is a flow diagram illustrating another example method for correcting field curvature.

FIG. 12 shows another exemplary method 1200 for correcting field curvature and other focus errors by dynamically positioning the objective lens or collimating lens in an EP imaging system having a post-objective scanning configuration. At block 1202, a laser source (e.g., a laser diode or a multi-element laser diode array) in an EP system emits a laser beam. At block 1204, the laser beam is focused by an objective lens, converging the beam to a focused image spot. At block 1206, the laser beam is scanned by a rotating scanner to form an image field. At block 1208, a required image position is determined for each position of the rotating scanner that will provide a focused image spot along the surface of a scanned photosensitive element. The laser source provides a stationary object position from which the required image position can be determined. An object-to-image distance (OID) is defined as the distance from the laser source (object position) to the photosensitive element (image position) measured along the optical axis and is given by:

$$OID = l_1 + l_2 + t + P_o + p_c \qquad \text{Object-to-Image Distance Equation}$$

Where $l_1$, $l_2$ and t are, respectively, the object conjugate distance, the image conjugate distance and the lens separation distance in a two-lens system, as previously described. The constant $P_o$ is the distance between the principal planes of the objective lens and the constant $P_c$ is the distance between the principal planes of the collimating lens. The OID equation can be used for the single lens case of FIG. 5 by setting t and $P_c$ equal to zero. OID is typically determined for each facet of a polygon scanner in a given imaging system in a calibration step during manufacturing. A required OID for each position of the rotating scanner is typically digitized and written to a look-up-table (LUT) or otherwise stored in the imaging device. At block 1210, the lens position, $l_1$ or t. that produces the required OID is calculated for each object-to-image distance according to which lens is dynamically positioned for focusing. If focusing is done by moving the objective lens, the objective lens position is determined by the object conjugate distance $l_1$. If focusing is done by moving the collimating lens, the collimating lens position is determined by the lens separation distance t. For systems such as the one illustrated in FIG. 5, having a single lens (i.e., an objective lens) between the laser source and the polygon scanner, $l_1$ is calculated using to the object-to-image distance equation and lens equation #1. As noted above, t and $P_c$ are set to zero in this single-lens case. This calculation can be done, for example, by using the object-to-image distance equation to express $l_2$ as a function of $l_1$ and the required OID. Substituting this expression for $l_2$ into lens equation #1 produces a single equation that can be solved directly for the single unknown $l_1$. In a two lens system wherein the objective lens is dynamically adjusted for focus control, $l_1$, is calculated using to the object-to-image distance equation and lens equation #2. The value of t is fully determined by the value of $l_1$ and is equal to K−$l_1$ where the constant K is the sum of $l_1$ and t, which is invariant during focusing. The values of K, $p_o$ and $p_c$ are established during the design of the optical system and are known constants. Substituting (K−$l_1$) for t in equation #2 and in the object-to-image distance equation yields two equations in the two variables $l_2$ and $l_2$, allowing $l_1$ to be calculated for any value of the required OID, thereby determining the objective lens position that will produce the required OID and, consequently, the required image position. In a two lens system wherein the collimating lens is dynamically adjusted for focus correction, t is calculated using to the object-to-image distance equation and lens equation #2. $l_1$ is constant while $l_2$ and t are variables. As before, the sum of $l_1$ and t is the constant K, and $l_1$ is equal to (K−t). Substituting (K−t) for $l_1$ in lens equation #2 and in the object-to-image distance equation produces two equations which can be solved simultaneously to determine t. Thus, t can be calculated for any value of the required OID needed to produce the required image position. In all cases, a unique position of the focusable lens, either the objective lens or the collimating lens, is calculated that produces the required OID. As noted above, distances $l_1$, $l_2$, and t might be calculated on an EP device itself, or alternatively, they might be calculated on and/or transferred to the EP device from a peripheral device such as personal computer. Such peripheral devices might provide pre-calculated distance parameters for each polygon position that are stored in a LUT, for example, and transferred to the EP device. Block 1212 of method 1200 represents alternative possible steps depending on the embodiment. At block 1112, in a first embodiment, the objective lens is dynamically positioned along the optical axis corresponding to the calculated distance parameter $l_1$. In this case, the objective lens is dynamically positioned by a focus control motor to be a distance from the laser source that is equal to the calculated distance parameter $l_1$. At block 1112, in another embodiment, a collimating lens located between the objective lens and the laser source is dynamically positioned along the optical axis corresponding to the calculated distance parameter. While systems and methods for dynamically correcting focus errors have generally been described for post-objective scanning systems having no scan lens interposed between the polygon scanner and the photosensitive element, these systems and methods are equally suitable for correcting residual field curvature in a pre-objective scanning system which only partially corrects field curvature or for correcting focus errors in a pre-objective scanning system due to other causes described herein. It will also be understood that while the collimating and objective lenses shown in the accompanying figures are generally illustrated as single-element lenses, in practice they may comprise two or more optical elements. As is customary in first order optics, lens equations #1 and #2 are based on a thin-lens approximation. When properly applied to real (thick) lenses, these equations provide a straightforward means to calculate object and image relationships with very good accuracy, but ray tracing is normally required to obtain exact results for real optical systems.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A method for dynamically correcting field curvature in an image produced by a rotating scanner, comprising:
    emitting a laser beam from a laser diode;
    passing the laser beam though an objective lens held in a fixed location;
    focusing the laser beam by dynamically positioning the laser diode along an optical axis defined by the laser beam, wherein field curvature in the image as displayed on a photosensitive element is lessened; and
    scanning the focused laser beam with the rotating scanner to create the image;
    wherein dynamically positioning the laser diode comprises:
        associating positions in the image defined on the photosensitive element with positions on the rotating scanner;
        calculating a laser diode position for positions in the image based in part on rotating scanner positions; and
        dynamically positioning the laser diode along the optical axis at the calculated positions associated with positions in the image.

2. A method as recited in claim 1, wherein dynamically positioning the laser diode comprises utilizing a lookup table.

3. A method as recited in claim 1, wherein the dynamically positioning the laser diode further comprises synchronizing positions of the rotating scanner with positions of the laser diode.

4. A method as recited in claim 1, wherein dynamically positioning the laser diode reduces field curvature in the image.

5. A processor-readable medium comprising processor-executable instructions to operate devices configured for:
   emitting a laser beam from a laser diode;
   focusing the laser beam with an objective lens located in a fixed position on an optical axis between the laser diode and a rotating scanner;
   reflecting the laser beam off of the rotating scanner to create an image field; and
   reducing field curvature in the image field by dynamically positioning the laser diode along the optical axis according to an orientation of the rotating scanner;
   wherein dynamically positioning the laser diode comprises:
      associating positions in the image field with positions on the rotating scanner;
      calculating laser diode positions for positions in the image field based in part on rotating scanner positions; and
      dynamically positioning the laser diode along the optical axis at the calculated positions associated with positions in the image field.

6. A processor-readable medium as recited in claim 5, wherein reducing field curvature focuses elements within the image field along a line at the surface of a photosensitive element.

7. A processor-readable medium comprising processor-executable instructions to operate devices configured for:
   emitting a laser beam from a laser diode;
   focusing the laser beam with an objective lens held in a fixed location on an optical axis between the laser diode and a rotating scanner;
   scanning the laser beam with the rotating scanner to create an image; and
   reducing curvature in the image field by dynamically positioning the laser diode along the optical axis;
   wherein the dynamically positioning the laser source further comprises:
      determining an image conjugate distance that provides a focused image spot on the photosensitive element for each position of the rotating scanner;
      calculating an object conjugate distance for each image conjugate distance based on a focal length of the objective lens; and
      dynamically positioning the laser source along an optical axis at distances away from the objective lens that equal each object conjugate distance calculated for each image conjugate distance.

8. A processor-readable medium as recited in claim 7, wherein the dynamically positioning the laser diode further comprises moving the laser diode back and forth in a direction along the optical axis.

9. A processor-readable medium as recited in claim 7, wherein the determining comprises looking up the image conjugate distance in a lookup table.

10. A processor-readable medium as recited in claim 7, wherein the dynamically positioning the laser diode further comprises synchronizing positions of the rotating scanner with positions of the laser diode.

11. A processor-readable medium comprising processor-executable instructions to operate devices configured for:
    emitting a laser beam from a laser diode;
    focusing the laser beam, by moving the laser diode with respect to an objective lens that is fixed in a location on an optical axis between the laser diode and a rotating scanner;
    reflecting the laser beam off of the rotating scanner to create an image field; and
    reducing field curvature in the image field by dynamically positioning the laser diode along the optical axis according to a position of the rotating scanner;
    wherein dynamically positioning the laser diode comprises:
       associating positions in the image field with positions on the rotating scanner;
       calculating laser diode positions for positions in the image field; and
       dynamically positioning the laser diode along the optical axis at the calculated positions associated with positions in the image field.

12. A processor-readable medium as recited in claim 11, wherein the removing field curvature focuses the image field along a line at the surface of a photosensitive element.

13. An electrophotographic (EP) imaging device comprising:
    a laser diode to generate a beam of light;
    a rotating scanner to sweep the beam of light and create an image field;
    an objective lens located in a fixed position between the laser diode and the rotating scanner along an optical axis; and
    a motion control system configured to dynamically position the laser diode along the optical axis to remove field curvature in the image field introduced by the rotating scanner;
    wherein the motion control system dynamically positions the laser diode by:
       associating positions in the image field with positions on the rotating scanner;
       calculating a laser diode position for each position in the image field based in part on rotating scanner positions; and
       dynamically positioning the laser diode along the optical axis at positions calculated for positions in the image field.

14. An electrophotographic (EP) imaging device comprising:
    a laser diode to generate a beam of light;
    a rotating scanner to sweep the beam of light and create an image field;
    an objective lens located in a fixed position between the laser diode and the rotating scanner along an optical axis;
    a collimating lens located between the objective lens and the light source along the optical axis; and
    a motion control system configured to dynamically move the laser diode along the optical axis such that the image field is focused in a line at the surface of a photosensitive element,
    wherein the motion control system dynamically positions the laser diode along the optical axis by:
       associating positions in the image field with positions on the rotating scanner;
       calculating a laser diode position for each position in the image field; and
       dynamically positioning the laser diode along the optical axis at positions calculated to associate with positions in the image field.

* * * * *

UNITED STATES PATENT AND TRADEMARK OFFICE
CERTIFICATE OF CORRECTION

| | | |
|---|---|---|
| PATENT NO. | : 7,460,146 B2 | Page 1 of 1 |
| APPLICATION NO. | : 10/978078 | |
| DATED | : December 2, 2008 | |
| INVENTOR(S) | : David K. Towner | |

It is certified that error appears in the above-identified patent and that said Letters Patent is hereby corrected as shown below:

In column 14, line 13, delete "parameter" and insert -- parameter t --, therefor.

In column 14, line 48, in Claim 1, delete "though" and insert -- through --, therefor.

Signed and Sealed this
Sixth Day of December, 2011

David J. Kappos
*Director of the United States Patent and Trademark Office*